(12) United States Patent
Hardee et al.

(10) Patent No.: US 10,394,317 B2
(45) Date of Patent: Aug. 27, 2019

(54) INTERACTION WITH HOLOGRAPHIC IMAGE NOTIFICATION

(71) Applicant: INTERNATIONAL BUSINESS MACHINES CORPORATION, Armonk, NY (US)

(72) Inventors: Christopher J. Hardee, Raleigh, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 15/267,050

(22) Filed: Sep. 15, 2016

(65) Prior Publication Data

US 2018/0074580 A1  Mar. 15, 2018

(51) Int. Cl.
*H04N 5/89* (2006.01)
*G06F 3/01* (2006.01)
*G03H 1/00* (2006.01)
*G08B 5/36* (2006.01)

(52) U.S. Cl.
CPC ............ *G06F 3/013* (2013.01); *G03H 1/0005* (2013.01); *G06F 3/017* (2013.01); *G08B 5/36* (2013.01); *G03H 2001/0061* (2013.01); *G03H 2210/30* (2013.01)

(58) Field of Classification Search
CPC ...... G03H 1/00; G03H 1/2202; G03H 1/2294; G03H 1/2249; G06K 9/00335; H04L 51/26
USPC ..................... 348/143; 715/728; 345/33, 633
See application file for complete search history.

(56) References Cited

U.S. PATENT DOCUMENTS

| | | | | |
|---|---|---|---|---|
| 4,832,427 A | * | 5/1989 | Nanba ............... | G02B 27/0018 359/15 |
| 2006/0001596 A1 | * | 1/2006 | Cuffaro ............... | G03H 1/2294 345/32 |
| 2014/0071163 A1 | * | 3/2014 | Kinnebrew .......... | G03H 1/2249 345/633 |
| 2014/0071229 A1 | | 3/2014 | Weerasinghe | |
| 2014/0160157 A1 | | 6/2014 | Poulos et al. | |
| 2014/0192084 A1 | | 7/2014 | Latta et al. | |
| 2014/0206418 A1 | | 7/2014 | Kim | |
| 2014/0282008 A1 | * | 9/2014 | Verard ..................... | G03H 1/00 715/728 |
| 2016/0063318 A1 | * | 3/2016 | Cheatham .......... | G06K 9/00335 348/143 |
| 2017/0293263 A1 | * | 10/2017 | Kitamura ............. | G03H 1/2202 |
| 2018/0032529 A1 | * | 2/2018 | Aradhye ................. | H04L 51/26 |

FOREIGN PATENT DOCUMENTS

| | | |
|---|---|---|
| WO | 2013054985 A1 | 4/2013 |
| WO | 2014049199 A1 | 4/2014 |
| WO | 2014093477 A1 | 6/2014 |

OTHER PUBLICATIONS

Capin et al., "The State of the Art in Mobile Graphics Research," IEEE Computer Graphics and Applications 4, 2008 (12 pages).

* cited by examiner

*Primary Examiner* — Gims S Philippe
(74) *Attorney, Agent, or Firm* — Griffiths & Seaton PLLC

(57) ABSTRACT

Embodiments for interaction with holographic image notifications by a processor. A notification to a user is displayed on an electronic device as a holographic image along a secondary field of view (FOV).

20 Claims, 9 Drawing Sheets

INTERACTION WITH HOLOGRAPHIC IMAGE NOTIFICATION

BACKGROUND OF THE INVENTION

Field of the Invention

The present invention relates in general to computing systems, and more particularly to, various embodiments for interaction with holographic image notifications using a computing processor.

Description of the Related Art

In today's society, consumers, users, and other individuals find themselves using a variety of computing devices, such as, for example, computers, laptops, tablets, televisions or smart phones. Many of these computing devices provide a variety of functionality and applications capable of being integrated or used across multiple platforms or devices. For example, smart phones now have the capability of functioning as televisions by displaying media content. In like fashion, many laptops integrate necessary components to deliver audio or visual communication thereby functioning as a mobile device. Many of these devices have common features and characteristics, such as a display screen for visualizing data. Accordingly, the use of computers, network appliances, and similar data processing devices continue to proliferate throughout society while providing many new advancements in technological features and characteristics.

SUMMARY OF THE INVENTION

Various embodiments for interaction with holographic image notifications by a processor, are provided. In one embodiment, by way of example only, a method for interaction with holographic image notifications, again by a processor, is provided. A notification to a user is displayed on an electronic device as a holographic image along a secondary field of view (FOV) of a display on a device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
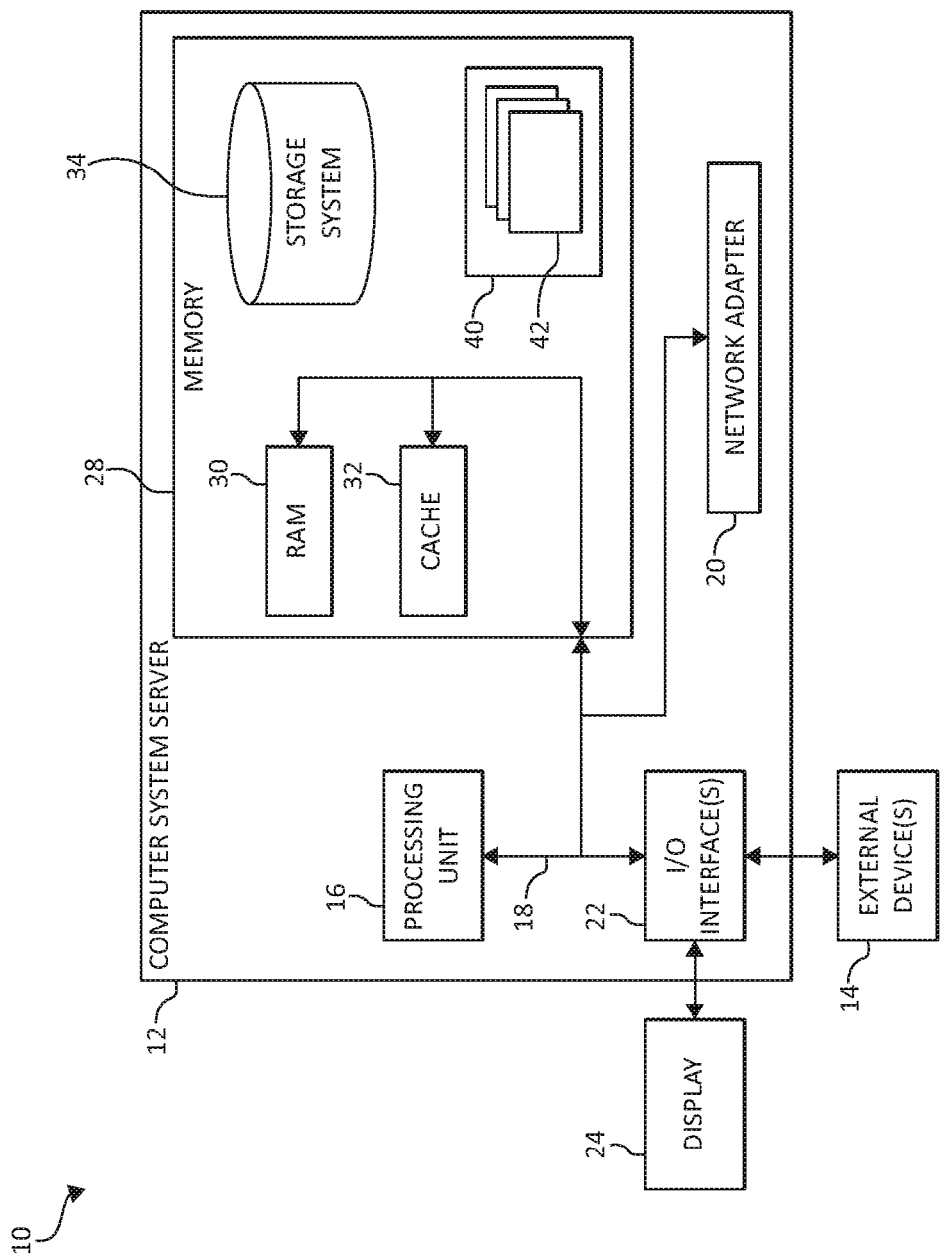
FIG. 1 is a block diagram depicting an exemplary cloud computing node according to an embodiment of the present invention.

Digital data representative of images (e.g., video or photos) is increasingly proliferating. Data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation of various functionality and applications in computing devices, such as displaying images, objects, and/or content on a display screen, a current challenge is the capability of providing various types of content on a device to be consumed by a user without conflicting with other data content.

In one aspect, interactive holographic displays may be provided on a computing device. The holographic display may be an interactive three dimensional image of an object to replicate an original, complete image of the object. A holographic image, such as a 3D holographic object, may be rendered for display on a computing device wherein the holographic images may be created in air (e.g. in "mid-air") and users may perform various interaction with the created holographic images (e.g., 3D holographic objects). More specifically, various computing devices may receive one or more notifications and/or alerts which may be represented as the holographic images. For example, the notifications and/or alerts may include, but not limited to, a telephone call, pop-up messages, email alert, text alert, emergency alert, battery power notification, a notification related to travel or business, a personalized alert, and/or a combination thereof. These notifications can create disturbances when other content is being viewed. Hence, the notifications and/or alerts may be represented as a holographic image (or holographic image notification) capable of being displayed as a three dimensional object from a two dimensional display screen of a device, such as, for example, a computer, a laptop, a tablet, a smart phone, a television, and the like. These holographic image notifications and/or alerts may be provided without interfering with the content being displayed on the computing device.

The mechanisms of the illustrated embodiments leverage infrastructures and various components in a computing device (e.g., an electronic device) for analyzing a user's attentiveness level on any content being displayed (e.g., how attentive a user is to currently displayed data content on a computing device). If an attention level ("attentiveness level") is greater than a selected threshold limit, the computing device may project holographic objects (e.g., a holographic image notification or alert). The holographic object may be rendered in a selected field of view (FOV) (e.g., a secondary FOV) of the user such that the viewing of the content in a primary FOV is not disturbed. If a user fails to perform one or more selected actions on the incoming holographic object during an additional selected threshold limit of time, then the position of the holographic object may selectively transition from the secondary FOV of the device towards the primary FOV of the device to draw the user's attention to the holographic object.

A user may also define priority scores for different types of notification or alert categories. In one aspect, the notification or alert categories may be included in a list with each type of notification and/or alert having an associated priority score. The position of the holographic object may be placed in a selected FOV according to the priority score for a selected notification or alert. In one aspect, each type of notification or alert (e.g., a telephone call, a text, a travel alert, an emergency notification, and the like) may be ranked according to the priority score and compared to other priority scores for determining the selected FOV to render the holographic object. Alternatively, the priority score of the notification or alert may be compared to a priority score threshold for determining the selected FOV to render the holographic object (e.g., notifications or alerts having priority scores that are greater than the priority score threshold may be rendered in a primary FOV while notifications or alerts having priority scores less than the prior score threshold may be rendered in a secondary FOV).

For example, assume a telephone call from a friend is received and telephone calls from the friend have a priority score that is greater than other priority scores and/or is greater than a priority score threshold. Since the priority score of the telephone call from the identified friend is greater than the priority score threshold, the holographic image representing the telephone call notification may be rendered directly in the secondary FOV or the primary FOV, according to user preference. As another example, assume a pop-up alert for an advertisement is received on the electronic device. The pop-up alert for the advertisement may be designed and/or assigned a priority score that indicates the pop-up alert is to always be rendered in the secondary FOV while being restricted from ever being displayed in the primary FOV.

Upon rending the holographic image in a selected FOV, one or more gestures may be received to interact with the holographic image alerts. The one or more gestures may include an indication to transfer the holographic image alert from one electronic device to another, such as, for example, swiping the holographic image alert in the direction of an alternative electronic device sharing the same display area. The one or more gestures may include an indication to transfer the holographic image alert from one FOV to an alternative FOV. Also, the one or more gestures may include an indication to transfer the holographic image alert from a selected FOV to an alternative FOV which may then share the same FOV as content that is displayed on a device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
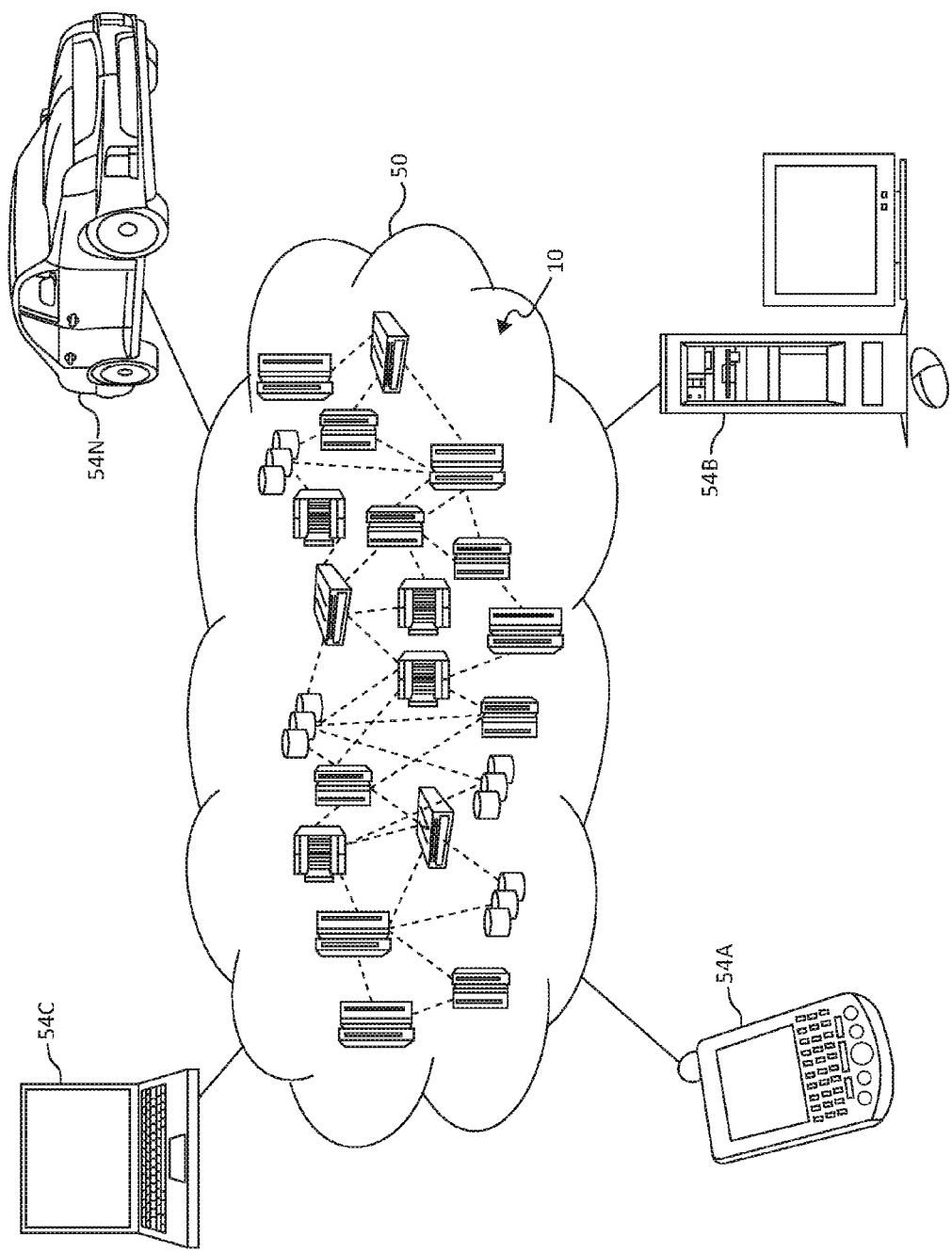
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
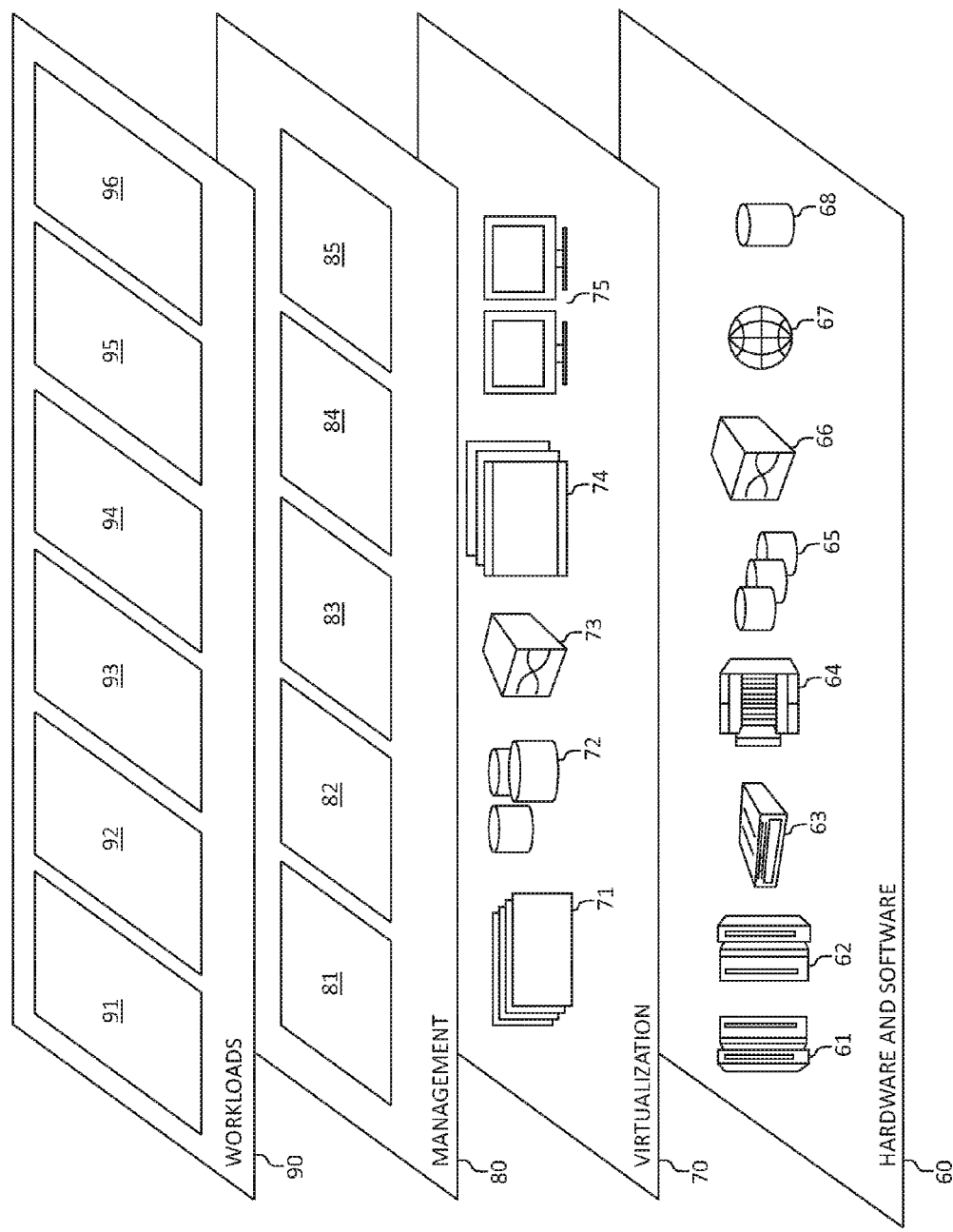
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various interaction with a holographic image notification workloads and functions 96. In addition, interaction with a holographic image notification workloads and functions 96 may include such operations as notification analytics, priority score analysis, holographic image displays or rendering operations as will be further described, user and device management functions. One of ordinary skill in the art will appreciate that the interaction with a holographic image notification workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
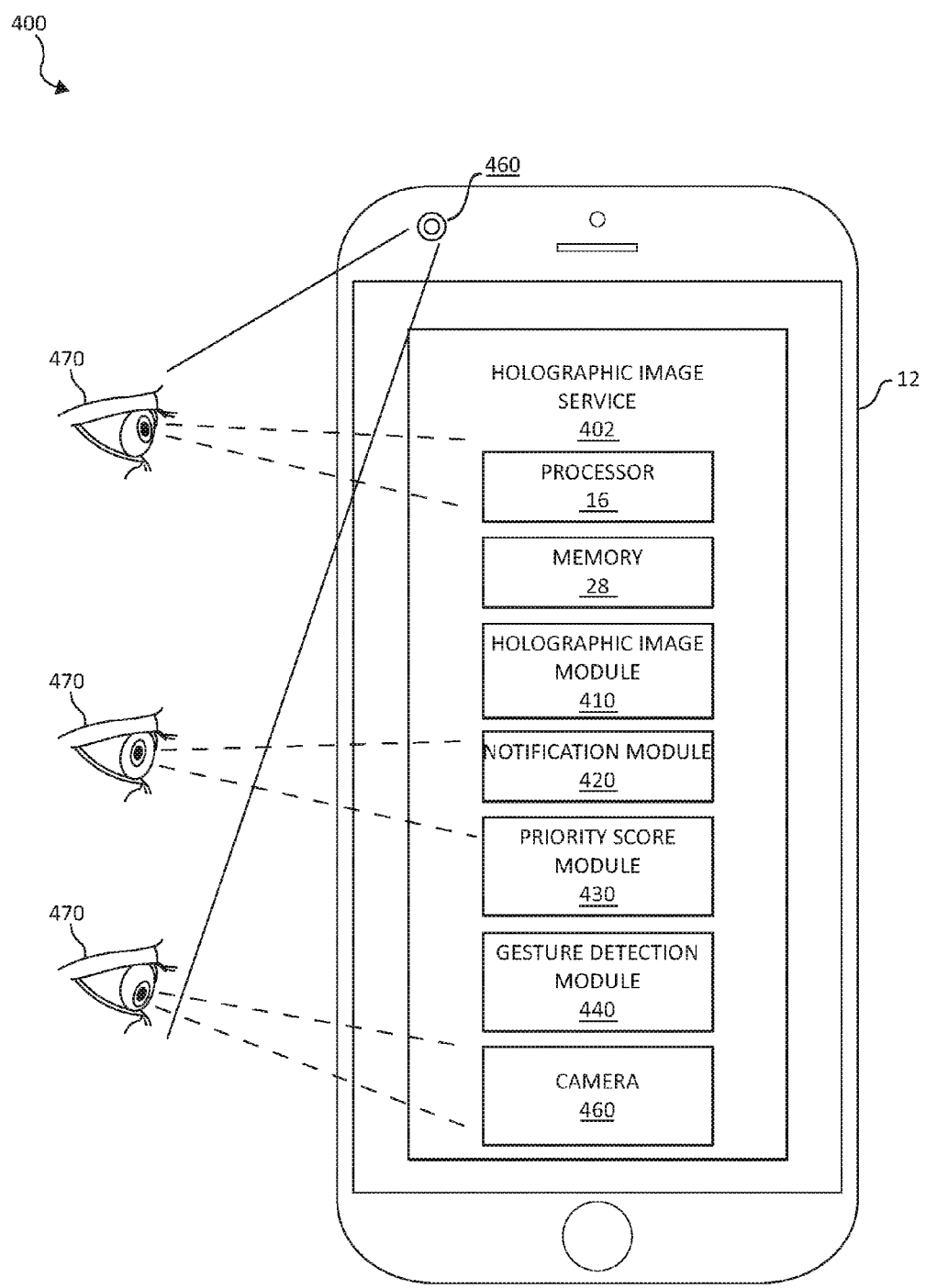
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for holographic image notification in accordance with the present invention. Many of the functional blocks 400 may execute as background processes on various components, either in distributed computing components, or on the user device, or elsewhere. Computer system/server 12 of FIG. 1 may be included for use in FIG. 4. For example, the computer system/server 12 of FIG. 4 may include a holographic image service 402. The holographic image service 402 may include a processing unit 16 and system memory 28 to perform various computational, data processing and other functionality in accordance with various aspects of the present invention. A holographic image module 410, notification module 420, priority score module 430, a gesture detection module 440, and/or a camera 460 (or camera module for controlling the camera 460) may also be included in the holographic image service 402. In one aspect, the computer system/server 12 may be a server, computer, laptop, tablet, television, smart phone, and/or any other computing device having a display, such a graphical user interface (GUI) on a two dimensional touch screen.

As one of ordinary skill in the art will appreciate, the depiction of the various functional units in computer system/server 12 (e.g., a mobile device) is for purposes of illustration, as the functional units may be located within computer system/server 12 or elsewhere within and/or between distributed computing components. The holographic image module 410 may provide one or more holographic images that appear to float in space and can change perspective. The holographic images of data (i.e. holographic image data) may be rendered in a 3D format (i.e. 3D data) or may display holographic images of data received in a 2D format where additional 3D data is provided or otherwise available to the computing device 12. The holographic image module 410 may display holographic images.

In one aspect, the holographic image module 410 may utilize light diffraction to create a virtual three-dimensional image of an object or a notification in a selected field of view of the user. Depending on the computing device, one or more holographic technologies may be used or developed, such as, for example, touchable holograms, laser, electro holography, full parallax/horizontal parallax only (HPO) and vertical parallax only (VPO), or micro-electro-mechanical systems (MEMS), and/or computer generated holography ("CGH").

In its simplest form, the holographic image module 410 may display objects as a three-dimensional holographic image. In one aspect, the holographic image module 410 may display the holographic object or image using a reflective medium (e.g., spinning mirrors, steam, hot air, etc.) onto which the image is projected. The holographic image module 410 may also display an interactive three-dimensional holographic image on a touch screen display without the use of a reflective medium. For example, a light source may produce one or more beams of an object representing the notification (e.g., a telephone image for an incoming call). One or more lens and/or micro-lens devices may generate a plurality of beams associated with a viewing angle in either the primary FOV or the secondary FOV. The one or more lens and/or micro-lens devices may position and/or steer one or more of the plurality of beams to alter, adjust, and/or change a deflection angle, in order to create and/or generate a holographic image notification of the object based on a focal length of the lens (e.g., the distance between the center of a lens or curved mirror and its focus) and either the primary FOV or the secondary FOV in relation to the user. A camera and/or one or more optical sensors may be used to gather and collect data regarding whether one or more gestures (e.g., hands, fingers, other device) interrupts the one or more beams, in order to determine a location of the one or more gestures (e.g., hands, fingers, other device) with respect to the holographic image, based on the obtained information from the camera and/or one or more optical sensors.

For example, a camera may capture both the primary FOV and the secondary FOV. The camera may detect and capture an image of the one or more gestures (e.g., hands, fingers, other device) interrupting the one or more beams. Alternatively, the one or more optical sensors may detect an interruption to the beams of the holographic image notification. In one aspect, the holographic image module 410 may display the interactive three-dimensional holographic notification on one or more interactive display screens, which may be a two-dimensional display. Typical interactive devices are incapable of providing an interactive three-dimensional holographic display device.

In one aspect, the holographic image may be a three-dimensional photographic image created using a principle of holograph, such as by dividing light emitted from a laser into two where one light may be used to directly illuminate a screen of the computing device and another is used to illuminate an object or notification to be viewed. The light used to directly illuminate a screen may be referred to as 'reference beam', and light used to illuminate an object or notification to be viewed may be called 'object beam'. The object beam may be reflected from a surface of an object. Accordingly, a phase difference (a distance from an object surface to a screen) may be different according to an object surface. The reference beam, which has not been transformed, may interfere with the object beam, and an interference pattern is stored into a screen. Here, a film having the interference pattern stored therein is called a 'hologram'. In order to reproduce the stored hologram, the reference beam used when recording has to be re-projected on the screen. Among light projected when reproducing, only light having the same oscillation frequency as that when recording is represented in three dimensions. Here, light having a different wavelength and a different phase is not represented in three dimensions.

As an additional embodiment, a micro display or a spatial light modulator (SLM) may be used as a holographic display. Further, the holographic image module 410 may display the holographic images based on optical MEMS. Where micro-display technologies are used, electrically switchable holographic optics may be used to solve display magnification problems without increasing the size and weight of the mobile devices.

Notification module 420 and priority score module 430 may work in concert with processing unit 16 and system memory 28 to accomplish various aspects of the present invention. The priority score module 430 may define a priority score for the notification such that reference is made to the priority score when selecting to display the holographic image in a primary FOV or the secondary FOV. That is, the priority score of each notification and/or alert may be automatically assigned and/or may also be provided by a user's own input of the computer device 12, or by other devices communicatively coupled via a network.

The notification module 420 may undergo various data analytics functions associated with the priority score module 430 to define a priority score and determine a position of the holographic image in a selected field of view of the computer device 12, which may display a GUI. The notification module 420 may make decisions in conjunction with the priority score module 430 to enable the holographic image to selectively be displayed according to a priority score on a device. The notification module 420 may also analyze an attention level (e.g., detected activity relating to the displayed content) on content being displayed on the device in a primary FOV. For example, activity (e.g., entering text into a field of a web page or scrolling through a web page) detected relating to the displayed content (e.g. a web browser in a GUI) within a selected time period may be classified as "active" or "attentive" whereas if the selected time period expires without detecting any activity relating to the content, the activity may be classified as "non-active" or "non-attentive". The holographic image module 410, working in conjunction with the notification module 420, may display the holographic image on a device according to an attention level on content being displayed on the device in a primary FOV.

The gesture detection module 440 may work in concert with processing unit 16 and system memory 28 to accomplish various aspects of the present invention. The gesture detection module 440 may receive one or more gestures to interact with the holographic image for responding to the notification. Moreover, holographic image module 410, working in conjunction with the gesture detection module 440, may display the holographic image in a primary FOV on a device upon expiration of a predetermined time period for receiving one or more gestures such that the holographic image is selectively transferred from the secondary FOV to the primary FOV.

In one aspect, the computer device 12 may include a camera 460 installed thereon and may track a user's attentiveness level while the user 470 (e.g., an eye of the user) is looking at any content on the display screen. For example, the camera may capture and detect a user's 470 attentiveness level based on how long the user is looking at the display with concentration. The device, such as the camera, may include gaze point tracker capabilities for tracking the user's eyes 470 in order to determine the user's FOV. The computer device 12, such as the camera 460, may also include the capabilities of detecting biological data (e.g., a retinal scan) of the eye of the user 470, capturing one or more photograph images of the user 470, and/or video recording of the user 470 in order to determine the angle of the user's eyes 470 and to determine if the user is looking at the content displayed on the device in the primary FOV, the secondary FOV, and/or determine if the user's 470 vision falls outside the primary FOV and/or the secondary FOV. The camera 460 may be configured for determining the angle of vision of the user 470 and focusing capabilities of the user 470 to determine if the user 470 is looking and focusing on displayed content as compared to the holographic image displayed in either the primary FOV, secondary FOV, or outside of the primary FOV and secondary FOV.

As one of ordinary skill in the art will appreciate, the holographic image notification service 402, and the modules defined therein, may implement mathematical modeling, holography, image processing, or other data processing technologies to carry out the various mechanisms of the illustrated embodiments. The interaction with holographic image notifications 402 may apply one or more mathematical operations or functions that may involve one or more mathematical operations (e.g., using addition, subtraction, division, multiplication, standard deviations, means, averages, statistical modeling using statistical distributions, by finding minimums, maximums or similar thresholds for combined variables, etc.).

Figure 5:
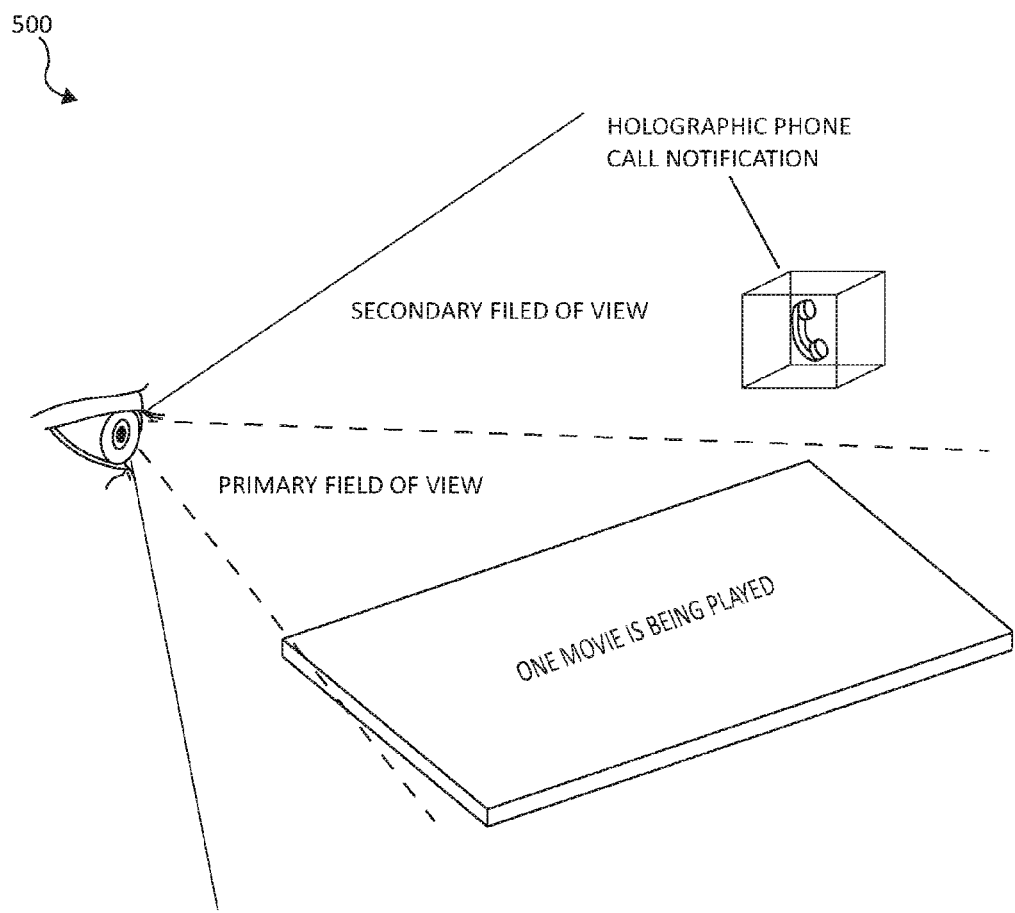
FIG. 5 is a block diagram depicting interaction with a holographic image notification in accordance with aspects of the present invention.

Turning now to FIG. 5, a diagram 500 depicting interaction with a holographic image notification in accordance with aspects of the present invention. The functionality 500 relating to interaction with a holographic image notification is depicted, for use in the overall context of interaction with a holographic image notification according to various aspects of the present invention.

In one aspect, incoming notifications, such as a telephonic call, may be rendered to the user as a holographic telephonic call notification. In one aspect, various types of notifications may be used, such as, for example incoming phone calls, messages, emails, battery power, etc. The holographic image may be related to the type of notification. For example, a telephone call may display a telephone as the holographic image. A text message may display a smart phone with text data displayed thereon as the holographic image. A battery power alert may display a battery as the holographic image.

To avoid the disturbance with the content being displayed on a device in the primary FOV of a user (e.g., while a movie is being played in the primary FOV), the holographic projector of the device may project an alert in secondary FOV. The current content being displayed in the primary FOV will not be affected.

Figure 6:
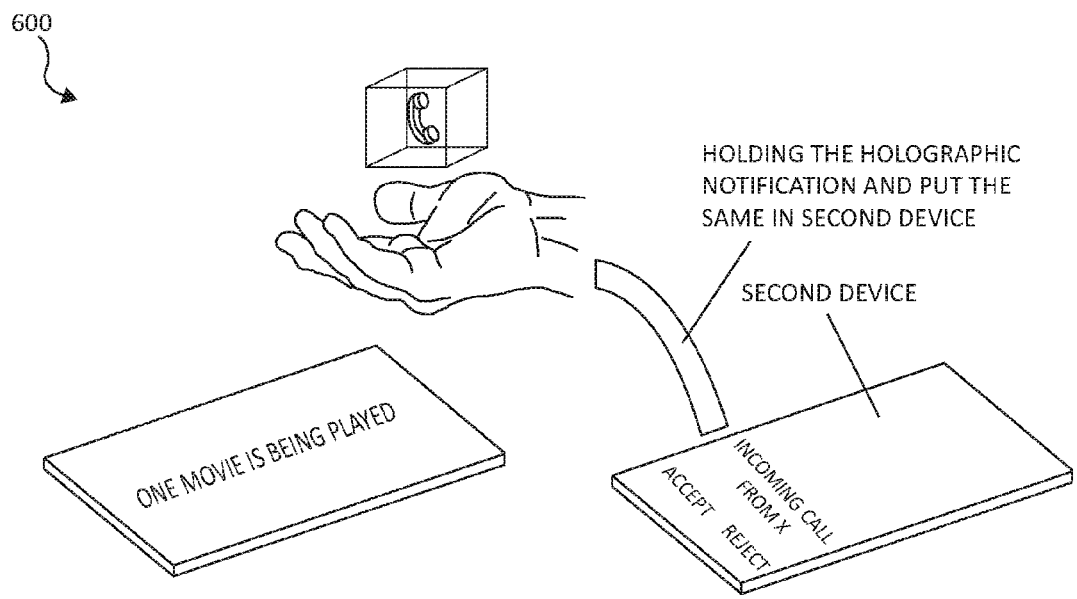
FIG. 6 is a block diagram depicting interaction with a holographic image notification and computing devices in accordance with aspects of the present invention.

FIG. 6 is a block diagram 600 depicting interaction with a holographic image notification and computing devices in accordance with aspects of the present invention. More specifically, FIG. 6 depicts that a user can select (e.g., hold, touch, pick up, etc.) the holographic image notification and then place the same in an alternative device (e.g., transfer from a laptop to a smart phone). Each and every detail (e.g., data and/or metadata) of the notification may be automatically transferred to the secondary device (e.g., transferred to a secondary cellular phone). For example, if in the primary device the user is watching a movie, an incoming phone call notification may be shown as a holographic object. The user may select (e.g., hold, touch, pick up, etc.) the object and "put" it in another device, so that the phone call will automatically be transferred to the secondary device.

Figure 7:
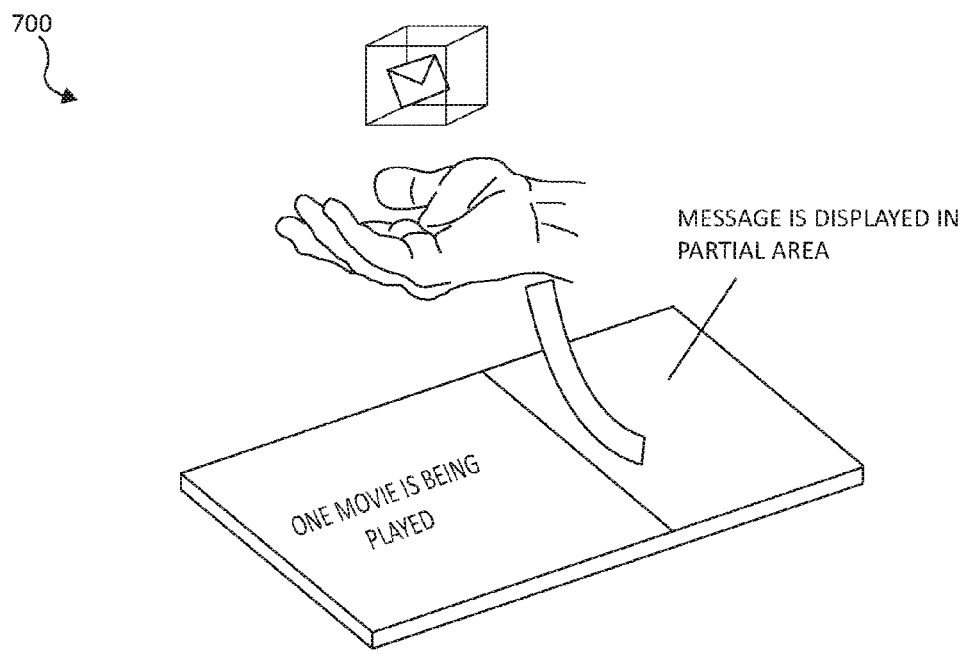
FIG. 7 is a block diagram depicting interaction with a holographic image notification on a computing device in accordance with aspects of the present invention.

FIG. 7 is a block diagram 700 depicting interaction with a holographic image notification on a computing device. In one aspect, a user may transfer the holographic image message alert within a same display, such that the message window may be shared with the current content window. For example, a message being displayed for the holographic image may be displayed in a partial section of the primary FOV and/or the secondary FOV. The display device may be configured such that the holographic image may share the display of the device.

Figure 8:
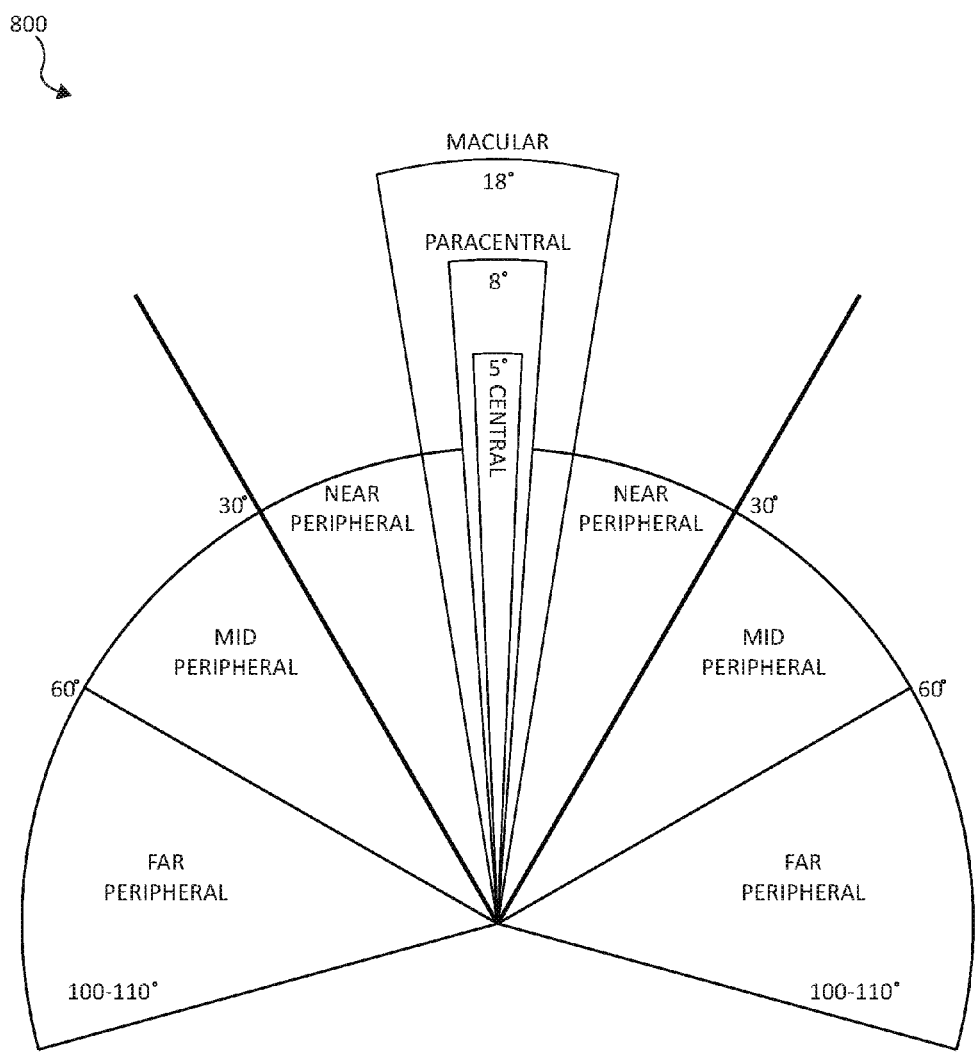
FIG. 8 is a block diagram depicting a field of view for displaying the holographic image notification on a computing device in accordance with aspects of the present invention.

Turning now to FIG. 8, a diagram depicting a field of view 800 for displaying the holographic image notification on a computing device in accordance with aspects of the present invention is shown. As depicted, a peripheral view of a user is illustrated, including the primary FOV and those areas outside the primary focus area. That is, the outside boundaries of the primary FOV may be the secondary FOV. In one aspect, the primary focus array may include a near peripheral view having a range ranging from 0 degrees up to a maximum angle of 30 degrees either facing the left or right degrees. A secondary FOV may commence in the region designated as a mid-peripheral view ranging from 30 degrees up to approximately 60 degrees either facing the left or right degrees. Also included in the secondary FOV is the region depicted as "far peripheral" ranging from approximately 100 degrees up to approximately 110 degrees (or greater) either facing the left or right degrees.

Figure 9:
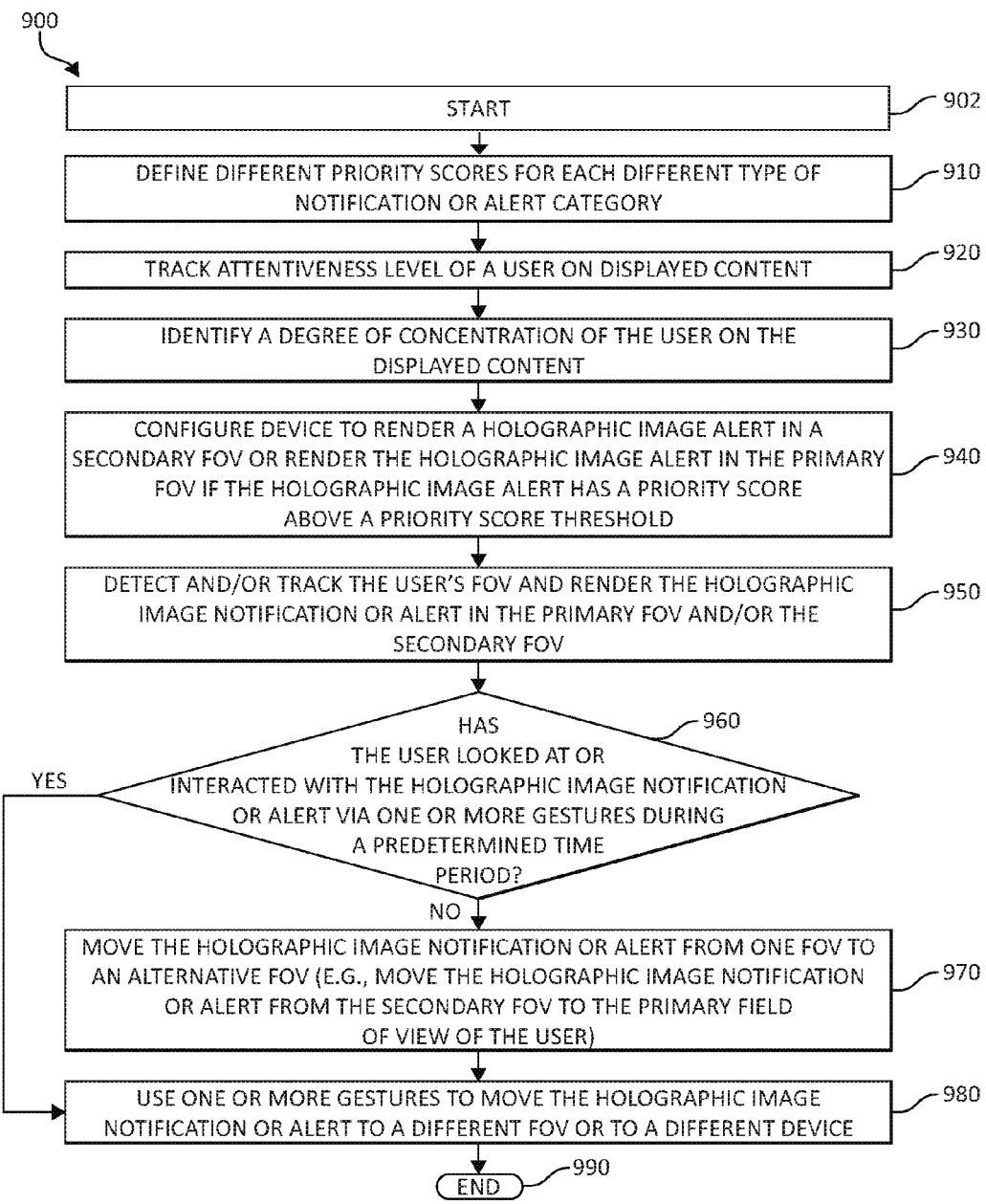
FIG. 9 is a flowchart diagram depicting an exemplary method for interaction with holographic image notifications by a processor, in which aspects of the present invention may be realized.

FIG. 9 is a flowchart diagram depicting an exemplary method for interaction with holographic image notifications by a processor, in which aspects of the present invention may be realized. That is, FIG. 9 is a flowchart of an additional example method 900 for semantic hierarchical grouping of text fragments in a computing environment according to an example of the present invention. The functionality 900 may be implemented as a method executed as instructions on a machine, where the instructions are included on at least one computer readable medium or one non-transitory machine-readable storage medium. The functionality 900 may start in block 902. In block 910, a user may define different priority scores for each different type of notification or alert category. For example, a phone call from the user's office may be assigned a priority score equal to one ("1"). In block 920, the device (e.g., a camera installed in the device) may track the user's attentiveness level while looking at any content on the display screen. For example, the camera may capture and detect the user's attentiveness level based on how long the user is looking at the display with concentration. The device, such as the camera, may include gaze point tracker capabilities for tracking the user's eyes in order to determining the user's FOV. The device, such as the camera, may also include the capabilities of detecting biological data (e.g., a retinal scan), capturing one or more photographs of the user, and/or video recording so as to determine the angle of the user's eyes and determine if the user is looking at and/or focusing on the content displayed on the device in the primary FOV, the secondary FOV, and/or determine if the user's vision falls outside the primary FOV and/or the secondary FOV.

In block 930, the device may identify a degree of concentration while looking at the content, such as, for example, according to a high concentration ("high attention level"), medium concentration ("medium attention level"), and/or a low concentration ("low attention level"), which may be defined according to user preference. For example, a high concentration may include the camera detecting (e.g., a retinal scan of the user, a series of photographs that may be compared, and/or a video recording) the user has maintained focus on the primary FOV for greater than a predetermined time period (e.g., greater than 1 minute). A medium concentration may include the camera detecting the user has maintained focus on the primary FOV for less than a predetermined time period (e.g., less than 1 minute) and/or the user has alternated back and forth the between the primary FOV and the secondary FOV during the predetermined time period. The low concentration may include the camera detecting the user has maintained focus on the secondary FOV or outside of the secondary FOV for greater than a predetermined time period (e.g., greater than 1 minute). Also, the low concentration may include the camera detecting the user has maintained focus on the secondary FOV or outside of the secondary FOV for greater than a predetermined time period.

In block 940, the user may selectively configure the device to render a holographic image alert in a secondary FOV and/or render the holographic image alert in the primary FOV if the holographic image alert has a priority score above a priority score threshold. That is, the user may selectively configure and/or change a display in such a way that when user is experiencing a high concentration towards displayed content, a holographic image notification or alert may be rendered in secondary field of view unless the holographic image notification or alert has a highest ranked priority score (e.g., a ranked priority score of one "1") as compared to other ranked priority scores or a priority score threshold.

In block 950, the device may detect and/or track the user's FOV and render the holographic image notification or alert in the primary FOV and/or the secondary FOV. For example, the device, such as by using the camera, may detect and/or track the user's FOV and one or more holographic projectors of the device may project the holographic image notification or alert into the air in either the primary FOV and/or the secondary FOV according to the user's configurations, rules, and/or priority scores.

In block 960, the device, such as by using the camera, may determine or detect if the user has looked at the holographic image notification or alert and/or interacted with the holographic image notification or alert via one or more gestures. For example, the camera may detect whether there is a change of focus in eye during a predetermined time. The camera may detect the interaction of one or more gestures with the holographic image notification or alert. In one aspect, the one or more gestures, may include, but not limited to, a hand swiping at or through the holographic image notification or alert, fingers trying to pick or grab the holographic image notification or alert, or the hand holding or covering the holographic image notification or alert for a selected period of time. If no in block 960, the functionality may move to block 970. If yes in block 960, the functionality may move to block 980.

In block 970, again based on configuration, if the device fails to detect any action or response on the holographic image notification or alert during a predetermined period of time for responding to or interacting with the holographic image notification or alert, the holographic image notification or alert may selectively transition from one FOV to an alternative FOV, such as gradually moving from the secondary FOV towards the primary FOV of the user. In one aspect, lower ranked priority holographic image notifications or alerts may be restricted from entering into the primary FOV. For example, assuming a priority score ranking ranks notifications from 1 to 10, with 1 being the highest rank with the greatest degree of importance to a user, while 10 represents the lowest rank with the least degree of importance to the user. Assume that all pop-up advertisement notifications are ranked as 10 and emergency notifications, such as police, fire, medical, etc., are ranked as 1. Accordingly, the user may define that any holographic image notification or alert having a priority score less than a priority score threshold (e.g., 5 through 10) are restricted from being rendered in the primary FOV. In this example, the holographic image notification or alert for the pop-up advertisement would only be rendered in the secondary FOV.

In block 980, the user may use one or more hand gestures to move and/or respond to the holographic image notification or alert. That is, the user may use one or more hand gestures (e.g., using hands or fingers) to hold, select, grab, pick, or swipe the holographic image notification or alert and move the holographic image notification or alert to an alternative FOV on the same device and/or move the holographic image notification or alert to a completely different device. The camera may detect the user's interaction with the holographic image notification or alert and accordingly may track one or more subsequent activities relating to the holographic image notification or alert as a result of the gestures taken on the holographic image notification or alert. For example, if a telephone call is received from a user's family member having a priority score of 1, the holographic image notification or alert may be displayed in the primary FOV. The device detects that the user interacts with the holographic image notification or alert by swiping at or grabbing the holographic image notification or alert with the hands or fingers. In response, the device may automatically answer the telephone call and/or signal a communication message to a device in communication with the device that is rending the holographic image notification or alert to automatically redial the family member. The communication message may include data and metadata associated with the holographic image notification or alert. The method may end at block 990.

It should also be noted that for those holographic image notifications or alerts having a priority score above a priority score threshold (as defined by the user), the content that was previously being displayed can be removed during notification, de-emphasized, and/or minimized (e.g., minimize a display of the content on a display screen). Also, one or more colors may be muted, a size of the objects may be reduced, a location of the holographic image notification or alert may be relocated from one position to an alternative position on the display of the device, which may be further away on the device from the user. Furthermore, individual objects or images being displayed optionally may have their attributes altered or changed to notify the user of a holographic image notification or alert, such as, for example, by changing the color or size.

Figure 10:
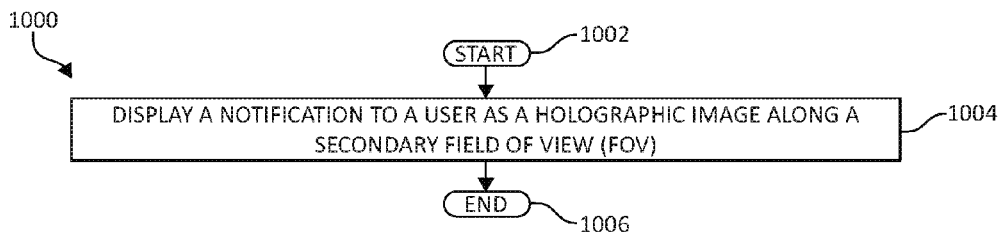
FIG. 10 is a flowchart diagram depicting an exemplary method for interaction with holographic image notifications by a processor, in which aspects of the present invention may be realized.

FIG. 10 is a flowchart diagram depicting an additional exemplary method for interaction with holographic image notifications by a processor, in which aspects of the present invention may be realized. That is, FIG. 10 is a flowchart of an additional example method 1000 for interaction with holographic image notifications in a computing environment according to an example of the present invention. The functionality 1000 may be implemented as a method executed as instructions on a machine, where the instructions are included on at least one computer readable medium or one non-transitory machine-readable storage medium. The functionality 1000 may start in block 1002. In block 1004, a notification to a user is displayed as a holographic image along a secondary field of view (FOV). The method 1000 then ends (step 1006).

In one aspect, in conjunction with and/or as part of at least one block of FIG. 10, the operations of method 1000 may include each of the following. The operations of method 1000 may display the holographic image on a device such that holographic image is selectively displayed according to a priority score. Priority scores may be defined for notifications and alerts such that reference is made to the priority scores when selecting to display the holographic image in a primary FOV or the secondary FOV.

The holographic image may be rendered on a device according to an attention level on content being displayed on the device in a primary FOV. The holographic image may be rendered in the secondary FOV upon analyzing an attention level on content being displayed in a primary FOV on a device exceeds an attention level threshold.

The operations of method 1000 may receive one or more gestures to interact with the holographic image for responding to the notification. The holographic image may be rendered on a device in a primary FOV on a device upon expiration of a predetermined time period for receiving one or more gestures such that the holographic image is selectively transferred from the secondary FOV to the primary FOV.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowchart and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for interaction with holographic image notifications, comprising:
   displaying a notification on an electronic device to a user as a holographic image along a secondary field of view (FOV) while the user is engaged with content displayed by the electronic device within a primary FOV such that the content displayed within the primary FOV is unencumbered by the notification displayed as the holographic image along the secondary FOV; wherein the notification displayed as the holographic image is associated with at least one of a telephone call, an email alert, a text message alert, and a system notification associated with an operating status of the electronic device.

2. The method of claim 1, further including displaying the holographic image such that the holographic image is selectively displayed according to a priority score, wherein the holographic image is a three dimensional object displayed from a two dimensional electronic device.

3. The method of claim 1, further including defining a priority score for the notification such that reference is made to the priority score when selecting to display the holographic image in the primary FOV or the secondary FOV.

4. The method of claim 1, further including displaying the holographic image on the electronic device according to an attention level on the content being displayed on the electronic device in the primary FOV.

5. The method of claim 1, further including displaying the holographic image in the secondary FOV upon analyzing an attention level on the content being displayed in the primary FOV on the electronic device exceeds an attention level threshold.

6. The method of claim 1, further including receiving one or more gestures to interact with the holographic image for responding to the notification.

7. The method of claim 1, further including displaying the holographic image in the primary FOV on the electronic device upon expiration of a predetermined time period for receiving one or more gestures such that the holographic image is selectively transferred from the secondary FOV to the primary FOV.

8. The method of claim 1, further including:
   transferring the holographic image from the secondary FOV to at least a portion of the primary FOV according to one or more gestures interacting with the holographic image such that the holographic image shares the primary FOV with the content; or
   transferring the holographic image from the electronic device to an alternative electronic device according to the one or more gestures.

9. A system for interaction with holographic image notifications, comprising:
   one or more computers with executable instructions that when executed cause the system to:
   display a notification on an electronic device to a user as a holographic image along a secondary field of view (FOV) while the user is engaged with content displayed by the electronic device within a primary FOV such that the content displayed within the primary FOV is unencumbered by the notification displayed as the holographic image along the secondary FOV; wherein the notification displayed as the holographic image is associated with at least one of a telephone call, an email alert, a text message alert, and a system notification associated with an operating status of the electronic device.

10. The system of claim 9, wherein the executable instructions display the holographic image such that the holographic image is selectively displayed according to a priority score, wherein the holographic image is a three dimensional object displayed from a two dimensional electronic device.

11. The system of claim 9, wherein the executable instructions define a priority score for the notification such that reference is made to the priority score when selecting to display the holographic image in the primary FOV or the secondary FOV.

12. The system of claim 9, wherein the executable instructions:
   display the holographic image on the electronic device according to an attention level on the content being displayed on the electronic device in the primary FOV; or
   display the holographic image in the secondary FOV upon analyzing the attention level on the content being displayed in the primary FOV on the electronic device exceeds an attention level threshold.

13. The system of claim 9, wherein the executable instructions receive one or more gestures to interact with the holographic image for responding to the notification.

14. The system of claim 9, wherein the executable instructions display the holographic image in the primary FOV on the electronic device upon expiration of a predetermined time period for receiving one or more gestures such that the holographic image is selectively transferred from the secondary FOV to the primary FOV.

15. The system of claim 9, wherein the executable instructions:
   transfer the holographic image from the secondary FOV to at least a portion of the primary FOV according to one or more gestures interacting with the holographic image such that the holographic image shares the primary FOV with the content; or
   transfer the holographic image from the electronic device to an alternative electronic device according to the one or more gestures.

16. A computer program product for, by a processor, interaction with holographic image notifications, the computer program product comprising a non-transitory computer-readable storage medium having computer-readable program code portions stored therein, the computer-readable program code portions comprising:
   an executable portion that displays a notification on an electronic device to a user as a holographic image along a secondary field of view (FOV) while the user is engaged with content displayed by the electronic device within a primary FOV such that the content displayed within the primary FOV is unencumbered by the notification displayed as the holographic image along the secondary FOV; wherein the notification displayed as the holographic image is associated with at least one of a telephone call, an email alert, a text message alert, and a system notification associated with an operating status of the electronic device.

17. The computer program product of claim 16, further including an executable portion that:
    displays the holographic image on the electronic device such that holographic image is selectively displayed according to a priority score, wherein the holographic image is a three dimensional object displayed from a two dimensional electronic device; or
    defines the priority score for the notification such that reference is made to the priority score when selecting to display the holographic image in the primary FOV or the secondary FOV.

18. The computer program product of claim 16, further including an executable portion that:
    displays the holographic image on the electronic device according to an attention level on the content being displayed on the electronic device in the primary FOV; or
    displays the holographic image in the secondary FOV upon analyzing the attention level on the content being displayed in the primary FOV on the electronic device exceeds an attention level threshold.

19. The computer program product of claim 16, further including an executable portion that:
    receives one or more gestures to interact with the holographic image for responding to the notification; or
    displays the holographic image in the primary FOV on the electronic device upon expiration of a predetermined time period for receiving the one or more gestures such that the holographic image is selectively transferred from the secondary FOV to the primary FOV.

20. The computer program product of claim 16, further including an executable portion that:
    transfers the holographic image from the secondary FOV to at least a portion of the primary FOV according to one or more gestures interacting with the holographic image such that the holographic image shares the primary FOV with the content; or
    transfers the holographic image from the electronic device to an alternative electronic device according to the one or more gestures.

\* \* \* \* \*